United States Patent [19]

Hesse et al.

[11] Patent Number: 5,354,809
[45] Date of Patent: Oct. 11, 1994

[54] PREPARATION OF A CURABLE MOLDING MATERIAL

[75] Inventors: Anton Hesse, Weinheim; Juergen Hofmann, Ludwigshafen; Walter Heckmann, Weinheim; Volker Warzelhan, Weisenheim, all of Fed. Rep. of Germany

[73] Assignee: BASF Aktiengesellschaft, Ludwigshafen, Fed. Rep. of Germany

[21] Appl. No.: 54,090

[22] Filed: Apr. 30, 1993

[30] Foreign Application Priority Data

May 30, 1992 [DE] Fed. Rep. of Germany ....... 4217914

[51] Int. Cl.$^5$ .................... C08L 63/10; C08L 67/06; C08L 75/16
[52] U.S. Cl. ........................ 525/64; 525/65; 525/66; 525/91; 525/108; 525/112; 525/125; 525/126; 525/166; 525/168; 525/169; 525/170; 523/448; 523/455; 523/509; 523/511
[58] Field of Search ............... 525/168, 126, 112, 169, 525/170, 64, 65, 66, 91, 166, 108, 125; 523/448, 509, 455, 511

[56] References Cited

U.S. PATENT DOCUMENTS

| | | |
|---|---|---|
| 3,256,362 | 6/1966 | Crattbner . |
| 3,959,209 | 5/1976 | Lake ..................... 525/168 |
| 4,161,471 | 7/1979 | Kassal . |

FOREIGN PATENT DOCUMENTS

| | | |
|---|---|---|
| 1153905 | 9/1963 | Fed. Rep. of Germany . |
| 1241983 | 12/1967 | Fed. Rep. of Germany . |
| 2305246 | 9/1973 | Fed. Rep. of Germany . |
| 2408898 | 8/1975 | Fed. Rep. of Germany . |
| 2410083 | 9/1975 | Fed. Rep. of Germany . |
| 2431410 | 1/1976 | Fed. Rep. of Germany . |
| 2449785 | 4/1976 | Fed. Rep. of Germany . |
| 2551144 | 5/1977 | Fed. Rep. of Germany . |
| 1250631 | 10/1971 | United Kingdom . |

*Primary Examiner*—Patricia A. Short
*Attorney, Agent, or Firm*—Oblon, Spivak, McClelland, Maier & Neustadt

[57] ABSTRACT

A curable molding material based on a dispersion of a finely divided ethylene polymer in an unsaturated polyester resin is prepared by a process in which a melt of the ethylene polymer is uniformly distributed in a melt of an unsaturated polyester in an extruder or stirred kettle.

8 Claims, No Drawings

PREPARATION OF A CURABLE MOLDING MATERIAL

The present invention relates to a process for the preparation of a curable molding material based on a dispersion of a finely divided ethylene polymer in an unsaturated polyester resin.

It is known that unsaturated polyester resins to which thermoplastics, e.g. polyethylene powders, have been added can be cured to give moldings having improved toughness and less tendency to shrinkage.

FR-A 1 148 285 describes the incorporation of polyethylene powder having a particle size of about 60 μm, together with an organic peroxide, into a solution of an unsaturated polyester resin in styrene. The casting resin obtained is cured to give moldings having improved electrical properties. According to GB-A 1 250 631, compression molding materials are prepared by mixing a solution of a polyester resin in styrene with a liquid polyester, finely divided polyethylene (particle size from 8 to 30 μm), a peroxide initiator, calcium carbonate as a filler and chopped glass fibers. The material is cured to give moldings having low shrinkage and little tendency toward exudation of the liquid polyester. In both cases, finely divided polyethylene powder is used. However, owing to the associated danger of dust explosions, the preparation and processing of such finely divided polyethylene powders is very problematic and, what is more, expensive, so that the stated processes have not been carried into practice. The same applies to the curable casting resin materials according to DE-B 24 31 410, which consist of a mixture of an unsaturated polyester, styrene and an ethylene polymer powder which is prepared by emulsion polymerization and subsequent spray drying and contains acid groups.

According to DE-A 12 41 983, polyester compression molding materials are prepared by mixing a solution of an ethylene/vinyl acetate copolymer in styrene with a solution of an unsaturated polyester in styrene and a peroxide.

However, such oil-in-oil emulsions tend to exhibit phase separation, which makes their processing problematic. This also applies to the SMC and BMC materials according to U.S. Pat. No. 4,161,471, which are elasticized by adding a chloroprene or ethylene/propylene rubber. The ethylene/propylene copolymers are first thermally degraded in an expensive process, then made into a paste with styrene and mixed with a polyester resin paste. This gives an oil-in-oil emulsion.

DE-A 23 05 246 relates to an unsaturated polyester resin material which contains a dispersed olefin graft polymer powder. Said olefin graft polymer is prepared by an involved method by exposure of polyethylene powder to electron beams, dispersion in water, addition of styrene, polymerization, filtration and drying of the resulting graft polymer, which is finally stirred into a solution of an unsaturated polyester in styrene.

DE-B 24 08 898, DE-B 24 10 083 and DE-A 24 49 785 describe a process for the preparation of a stable dispersion of an ethylene polymer in a solution of unsaturated polyester in styrene, which dispersion exhibits good flow. An ethylene polymer, for example low density polyethylene, is dissolved in styrene at elevated temperatures, this solution is combined with a solution of the unsaturated polyester in styrene at from 50° to 120° C. in a zone of high turbulence and the action of strong shearing forces and the mixture is stirred until a low-viscosity state exhibiting good flow has formed. This technically very complicated process has also not become established in practice. This also applies to the process according to DE-C 25 51 144, in which the action of strong shearing forces can be dispensed with if the combined styrene solutions are stirred in the presence of a thixotropic agent containing urethane groups. In this case, however, long residence times are required; in the Examples, stirring is carried out for 4 hours in each case.

It is an object of the present invention to provide a technically simple process, which can be carried out at short cycle times, for the preparation of dispersions of finely divided ethylene polymers in an unsaturated polyester resin, which dispersions can be cured after the addition of peroxide initiators to give tough, low-shrinkage moldings.

We have found that this object is achieved, according to the invention, if a melt of the ethylene polymer is uniformly distributed in a melt of the unsaturated polyester.

The present invention furthermore relates to monomer-free granular molding materials of from 90 to 50% by weight of an unsaturated polyester and from 10 to 50% by weight of an ethylene polymer, and to free-flowing injection molding materials which can be prepared therefrom and contain up to 30 parts by weight, based on A+B, of a copolymerizable monomer having a boiling point above 150° C. These molding materials are novel and are not obtainable even by the stated prior art processes.

In production on the industrial scale, polyethylene is obtained as granules or grit having a diameter of more than 1 mm. It cannot be milled at room temperature. Milling at low temperatures, which is very expensive and is not without danger owing to the risk of dust explosions, gives particles having a diameter of from 150 to 300 μm which have an irregular shape and a rough, porous surface. If such milled polyethylene particles are added to unsaturated polyester resins and the latter are cured, the moldings obtained have an irregular surface. The novel dispersion of, preferably, round polyethylene particles having a smooth surface and a mean diameter of from 2 to 200 μm in the polyester resin is obtained if the melt of the ethylene polymer is uniformly distributed in the melt of the unsaturated polyester.

DE-B 1 153 905 describes a process for the preparation of molding materials, in which a mixture of more than 50% by weight of polyolefin and less than 50% by weight of unsaturated polyester resin is thoroughly kneaded in the presence of free radical initiators at from 60° to 350° C. The components can first be premixed in a conventional mixing apparatus, for example a vortex mixer or impeller mixer. However, this does not result in the formation of a dispersion of finely divided polyolefin particles in the polyester resin. When the mixture is kneaded in the presence of the free radical initiator, the polyester resin undergoes crosslinking and is then dispersed in the polyolefin as a coherent phase. The molding material obtained no longer has the good flow of an unsaturated polyester resin.

Regarding the individual components, the following may be stated: Unsaturated polyesters contain

and —CH=CH— groups.

1. Preference is given to unsaturated polyesters (UPs) with strictest sense. These are condensates of polybasic, in particular dibasic, carboxylic acids and esterifiable derivatives thereof, in particular anhydrides thereof, which are bonded by an ester bond to polyhydric, in particular dihydric, alcohols and may contain additional radicals of monobasic carboxylic acids or monohydric alcohols, and at least part of the starting materials must have ethylenically unsaturated, copolymerizable groups.

The acid number of the unsaturated polyester resin should be below 100, in particular from 0 to 50. Particularly preferred polyester resins are those of maleic acid, if necessary together with ophthalic acid, on the one hand and diols, such as dipropylene glycol, diethylene glycol and/or 1,2-propanediol, on the other hand, dissolved in styrene.

Particularly good binding of the polyethylene phase to the polyester phase in the molding is obtained when the unsaturated polyester resins contain cycloaliphatic building blocks, preferably those based on dicyclopentadiene, tetrahydrophthalic acid or endomethylenetetrahydrophthalic acid. The amount of the cycloaliphatic building blocks in the unsaturated polyester is preferably from 0.1 to 2 mol per (maleic acid+fumaric acid) building block.

2. Vinyl ester resins (VE resins) are also suitable. The group

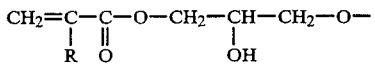

where R is H or $CH_3$, is typical of this class of resins.

VE resins, which are also referred to as epoxyacrylates, are generally understood as being reaction products of polyepoxides with unsaturated monocarboxylic acids, preferably with methacrylic acid. These resins are described in, for example, GB-A 1 006 587 and U.S. Pat. Nos. 3,066,112 and 3,179,623, VE resins based on bisphenol A being preferably used. They possess great toughness and good resistance to chemicals in conjunction with limited heat distortion resistance. In contrast, vinyl ester resins obtained from epoxy novolak resins and (meth)acrylate acid, as described in, for example, U.S. Pat. No. 3,256,126, have higher heat distortion resistances but lower toughness.

3. Vinyl ester urethane resins (VU resins) are known, for example from U.S. Pat. No. 3,297,845, U.S. Pat. No. 3,772,404, U.S. Pat. No. 4,618,658, GB-A 2 217 722 and DE-A 34 44 390. They generally have the following groups:

a) 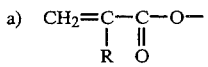

(where R is H or $CH_3$), b) 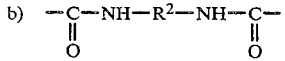

(where $R^2$ is a divalent aliphatic, aromatic or cycloaliphatic radical of 4 to 40 carbon atoms, preferably an aromatic radical of 6 to 20 carbon atoms), if required,

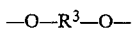 (c)

(where $R^3$ is a divalent aliphatic, cycloaliphatic or aromatic radical of 2 to 500 carbon atoms, preferably an aliphatic radical of 4 to 100 carbon atoms)

and, if required,

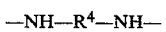 (d)

(where $R^4$ is an aliphatic, cycloaliphatic or aromatic radical of 2 to 100 carbon atoms).

The UV resin is preferably a reaction product of
a polyfunctional isocyanate,
if required, a polyhydric alcohol,
if required, a polyfunctional amine, and
a hydroxyalkyl (meth)acrylate,
in the reaction the weight ratio of isocyanate to (alcohol+amine) being from 100:0 to 100:300 and the ratio of the number of equivalents of hydroxyalkyl (meth)acrylate to the number of equivalents of free isocyanate groups of the reaction product being from 3:1 to 1:2.

For the purposes of the present invention, ethylene polymers are homopolymers of ethylene and copolymers with less than 50, in particular from 0 to 40, mol % of conventional comonomers. The comonomers used are α-olefins with 3 to 8 carbon atoms, such as propylene, isobutene or but-1-ene. Vinyl esters of organic carboxylic acids of 1 to 19 carbon atoms, preferably vinyl acetate, vinyl halides, such as vinyl chloride, (meth)acrylic acid, esters thereof which contain from 1 to 8 carbon atoms in the alcohol component, nitriles and amides thereof, for example methyl methacrylate, ethyl acrylate, butyl acrylate, (meth)acrylonitrile and unsubstituted or substituted (meth)acrylamide, are also suitable. Graft copolymers, for example those having maleic anhydride as a graft comonomer, are also useful.

A preferred ethylene polymer is low density polyethylene, and polyethylene types prepared by the low pressure and medium pressure processes are also suitable.

The melt flow indices of the ethylene polymer, measured according to DIN 53,735 at 190° C. and under a load of 2.16 kp, are preferably in the range from non-flowable to 1,000 [g/10 min]; polyethylene types having melt flow indices of from 1 to 40 are preferably used.

The DSC melting points measured according to ISO 3146 are preferably below 136° C., in particular from 90° to 135° C.

Mixtures of different ethylene polymers may also be used, and the components may differ substantially in their molecular weight, the polarity and the melting point. Mixtures of ethylene polymers of minor amounts of other thermoplastics, for example polypropylene, in particular a low molecular weight, thermally degraded polypropylene, or a polypropylene grafted with maleic anhydride, may also be used as starting materials. Mixing of the various polymers is carried out either before or during dispersing in the melt of the unsaturated polyester.

In the novel process, a melt of the ethylene polymer B is uniformly distributed in a melt of the unsaturated polyester A, and a dispersion of the ethylene polymer as the disperse phase in the unsaturated polyester as the coherent phase is prepared in this manner. This can be carried out using any suitable mixing apparatus, preferably in an extruder or a stirred kettle having internal or external mixing apparatuses.

a) Extruder process

The ethylene polymer is melted, preferably at from 120° to 240° C., in particular from 160° to 200° C., in an extruder which may be, for example, a twin-screw extruder. A melt of the unsaturated polyester, which is preferably at from 100° to 150° C., is fed in via a side extruder or by means of a pump. The residence time of the melt in the extruder is preferably from 20 to 300 seconds. Mixing of the melts is carried out in a shear field whose dissipation energy is preferably from 0.05 to 0.4 [kWh·kg$^{-1}$]. The dissipation energy is the specific energy input into the shearing element. For example, in the case of a twin-screw extruder, it can be calculated from the torque and the power consumption of the electric motor which transmits the energy from the two shafts of the extruder. As a result of this shearing, the ethylene polymer is comminuted to a particle size of less than 200 μm, in particular from 10 to 100 μm. Since the comminution takes place in the melt, round, almost spherical particles having a smooth surface are formed and are maintained in this form as the disperse phase in the coherent polyester phase even on cooling. This is shown very clearly by the accompanying Figure, a micrograph of a polyethylene dispersion in a solution of an unsaturated polyester resin in styrene, in dark field/transmitted light. Cooling to below the crytallite melting point of the ethylene polymer, preferably below 120° C., is also carried out in the extruder, so that a dispersion of solid ethylene polymer particles in liquid unsaturated polyester is extruded from said extruder. This dispersion is then either directly mixed with a vinyl monomer C or is further cooled by extruding it, for example, in water or is granulated in the melt. The dry, blocking-resistant granules can be stored and transported and further processed as required.

The material is a novel, curable, monomer-free molding material in granular form, containing A) from 90 to 50% by weight of an unsaturated polyester and B) from 10 to 50% by weight of an ethylene polymer.

These granules can, if required, be dissolved in vinyl monomers C, e.g. styrene, or can be further processed to give a free-flowing injection molding material, which is likewise novel. In this case, unsaturated polyesters having a Krämer-Nagel-Sarnow softening point of at least 70° C. are preferred, in particular crystalline unsaturated polyesters which are composed of symmetrical monomer building blocks, such as fumaric acid, terephthalic acid, 1,4-butanediol or 1,6-hexanediol.

The free-flowing injection molding material contains

A) from 90 to 50% by weight of an unsaturated polyester having a Krämer-Sarnow-Nagel softening point of at least 70° C., B) from 10 to 50% by weight of an ethylene polymer, C') from 0 to 30 parts by weight, based on 100 parts by weight of A+B, of a copolymerizable monomer having a boiling point above 140° C. (at atmospheric pressure)

and, if required, further conventional additives.

Suitable monomers C' having a boiling point above 150° C. are, for example, diallyl phthalate, diallyl isophthalate and methacrylates of trimethylolpropane, neopentylglycol, ethylene glycol, 2-hydroxyethane and 2-hydroxypropane.

In addition, the injection molding material may contain further conventional additives, such as peroxide initiators, lubricants, mold release agents, pigments, fillers and short glass fibers. The monomer C' and the further additives are mixed with the granules A+B in a conventional mixing apparatus, for example a kneader, a roll mill or an extruder, at below the decomposition temperature of the peroxide initiator, preferably at from 70° to 100° C.

As indicated above, the molding material prepared according to the invention can be mixed with conventional monomers C. Low-boiling vinyl monomers, e.g. styrene, α-methylstyrene, vinyltoluene, methyl methacrylate or mixtures thereof, are particularly suitable for this purpose. Styrene is preferred, in particular in amounts of from 10 to 100 parts by weight, based on 100 parts by weight of A+B.

Admixing can be carried out by various methods: After mixing of the melts, the monomer can be fed directly into the extruder and the mixture prepared there; the molding material from the extruder can be introduced as a melt into liquid monomer which may or may not have been heated and can be distributed therein by stirring, and finally granulated molding material can be stirred with the monomer, the unsaturated polyester dissolving.

In all cases, a dispersion of the finely divided ethylene polymer B in a solution of the unsaturated polyester A in the vinyl monomer C is formed.

b) Stirred kettle process

Mixing of the polyester melt with the ethylene polymer melt according to the invention can also be carried out in a conventional stirred kettle which is equipped with a powerful stirrer. A batchwise method is preferably used. This process can be advantageously carried out if the crystallite melting point of the ethylene polymer is below 125° C., for example with high density polyethylene, and if dispersants are added.

The ethylene polymer, either as a melt or, preferably, in the form of granules or grit, can be introduced into the stirred kettle containing the melt of the unsaturated polyester. The melt temperature in the stirred kettle is from 140° to 220° C., preferably from 150° to 200° C., and the residence time is from 10 to 60, preferably from 20 to 40, minutes. After the end of the dispersing process, the melt is discharged from the kettle. It can be granulated; however, it is preferably subsequently mixed with vinyl monomers. This may be effected either by adding the required amount of monomer to the stirred kettle and stirring it with the melt or by introducing the melt into a downstream stirred kettle which contains the monomer, which is preferably heated to 40°–90° C.

Both in the extruder process and in the stirred kettle process, a dispersion of the ethylene polymer B in the form of round particles having a diameter from 2 to 200 μm in the polyester resin A+C is formed after the addition of vinyl monomer and cooling. To keep the dispersion stable over a prolonged period and to avoid agglomeration of the ethylene polymer particles, a conventional surfactant dispersant D is advantageously added, preferably in amounts of from 0.1 to 15, in particular from 0.5 to 5 parts by weight, based on 100 parts by weight of A+B. The dispersion then has the following composition:

A) from 90 to 50% by weight of an unsaturated polyester,
B) from 10 to 50% by weight of an ethylene polymer,
C) from 10 to 100 parts by weight, based on 100 parts by weight of A+B, of a vinyl monomer and
D) from 0 to 15 parts by weight, based on 100 parts by weight of A+B, of a dispersant.

Suitable dispersants D are polymers which are soluble in vinyl aromatics or in unsaturated polyesters or in a polyester/vinyl aromatic mixture. Ethylene/vinyl acetate copolymers or polyvinyl acetates are preferred, particularly preferably those having a vinyl acetate content of from 60 to 100% by weight and a Mooney viscosity of at least 15, preferably from 40 to 65, Mooney, measured according to DIN 53,523 (L-4).

Poly(meth)acrylate homo- and copolymers, for example poly-(decyl acrylates) or copolymers of ethylene with (meth)acrylates and graft polymers with the stated polymers as a grafting base are also suitable. Polyethers, such as polyethylene oxide, polypropylene oxide and block copolymers of these two compounds, ethoxylated saturated and unsaturated fatty acids and derivatives thereof as well as cellulose derivatives, such as methylcellulose, ethylenehydroxycellulose or cellulose esters, e.g. cellulose acetate, cellulose acetopropionate, cellulose acetobutyrate or nitrocellulose, are also useful. Other suitable dispersants are block copolymers having polar and nonpolar block segments which may have a linear, branched or comb-like structure. For example, such substances are described in DE-A 24 02 739. They contain polyether blocks and nonpolar segments of vinyl aromatic monomers or conjugated dienes.

Further additives are then mixed with the liquid dispersion of ethylene polymer particles in the polyester resin, advantageously in two stages. First, shrinkage-reducing thermoplastics, inhibitors, accelerators, viscosity depressants and waxes are added, each advantageously dissolved or dispersed in monomer C. The dispersion obtained has good flow and a long shelf life. In exceptional cases, i.e. where there is a high content of ethylene polymer, said dispersion is in the form of a paste which has to be gently heated for further processing. Shortly before further processing, a free radical initiator is then added, if necessary together with fillers, fibers, release agents, lubricants and thickeners. If it is intended to prepare SMC materials, the material is shaped into a sheet-like semifinished product together with reinforcing fibers and is thickened.

The heat-curable molding material is in the form of an SMC, a BMC, a free-flowing injection molding material or a paste. Further processing can accordingly be carried out by various methods: SMC materials are molded in presses, BMC materials and free-flowing materials by injection molding or injection stamping and pastes by pultrusion. Curing of the polyester resin is carried out during or after molding, preferably at above 50° C., in particular from 120° to 170° C.

After curing, the ethylene polymer remains as the disperse phase in the cured polyester resin as the coherent phase. In the molding, the ethylene polymer results in a dramatic reduction in the susceptibility to cracking under impact, but the thermoset character of the moldings, i.e. high heat distortion resistance and good surface properties, is retained.

The novel molding materials are used for the production of automotive parts, for example engine hoods, tailgates, bumper supports and front ends in the bodywork area and sound insulations, intake manifolds and covers in the engine area, as well as for spare wheel depressions, backrests for seats and reflectors for headlamps. Applications in the electrical sector also play a role, for example in the production of distribution boxes, long-field lights and housings for electrical systems.

In the Examples which follow, parts and percentages are by weight.

EXAMPLES

A) Unsaturated polyester resins
UP resin A1

A monomer-free unsaturated polyester was prepared in a two-stage condensation process with stirring and by passing over nitrogen. In the first stage, isophthalic acid, neopentylglycol and propylene glycol reacted in a molar ratio of 1:1.2:0.23 at up to 200° C. to an acid number of 10 and a melt viscosity of 1,000 [mPa.s] (plate-and-cone viscometer from Epprecht Instruments+Controls AG) at 125° C. After the addition of maleic anhydride and further neopentylglycol in a molar ratio of 1:0.6, based on 1 mol of isophthalic acid used, esterification was finally carried out to an acid number of 19 and a melt viscosity (175° C.) of 4,300 [mPa.s], the mixture was cooled to 150° C., 180 ppm of hydroquinone was added and the mixture was poured out into cooling trays. On cooling to 23° C., the product solidified into a glassy mass and could be broken. The granules exhibited blocking-resistance during storage and had a softening point of 80° C. (according to Krämer-Sarnow-Nagel).

UP resin A2

An unsaturated polyester having an acid number of 12 was prepared in a two-stage process in which, in the first step, equimolar amounts of dicyclopentadiene and maleic acid were reacted at from 125 to 135° C. to give the maleic half-ester and, in a subsequent step, the product was condensed with neopentylglycol and propylene glycol at 190° C. The starting materials were present in a molar ratio of 1:1:0.5:0.05.

The unsaturated polyester was dissolved in styrene to give 70% strength solution and stabilized with 100 ppm of hydroquinone.

B) Ethylene polymers

| B) | Ethylene polymers | |
|---|---|---|
| B1: | Ethylene polymer with melt flow index MFI (190/2.16) Melting point (DSC) 132 [°C.] (ISO 3146) Density: 0.954 [g/cm$^3$] (DIN 53,479-A) | 18 [g/10 min] (DIN 53,735) |
| B2: | Ethylene homopolymer with melt flow index MFI (190/2.16) 20 [g/10 min] Melting point (DSC) 106 [°C.] Density: 0.916 [g/cm$^3$] | |
| B3: | Ethylene homopolymer with melt flow index MFI (190/2.16) 36 [g/10 min] Melting point (DSC) 112 [°C.] Density: 0.924 [g/cm$^3$] | |

EXAMPLE 1

It is concerned with melt dispersion of polyethylene in an unsaturated polyester, the preparation of a dispersion in a solution of polyester resin in styrene, which dispersion exhibits flow at room temperature, and processing of the said dispersion to give an SMC.

a) Melt dispersion

For the preparation of granules having a disperse polyethylene phase, polyethylene B1 was melted at 150° C. in a twin-screw extruder (type ZKS 30, Werner & Pfleiderer), and the melt of the unsaturated polyester A1 at 130° C. was introduced from a side extruder. The screw speed was 150 revolutions/minute, the temperature in the mixing zone was 145° C. and that at the extrusion die was 144° C. The extrudate was drawn through water and granulated. It contained 40% of polyethylene and 60% of unsaturated polyester. The granules could be stored for weeks at 23° C. without blocking.

b) Preparation of a dispersion

In a stirred apparatus, 30 parts of styrene were mixed, at 23° C., a little at a time and with stirring, with 70 parts of the above granules, 100 ppm of hydroquinone and 550 ppm of 2,6-dimethylquinone were added and the mixture was heated to 80° C. After two hours, a dispersion exhibiting flow and having an acid number of 7.3 and a viscosity (23° C.) of 10,000 [mPa.s] had formed. To characterize the polyethylene phase, the dispersion was investigated by optical microscopy. The attached photograph shows a dark field/transmitted light micrograph (magnification 100:1) of the polyethylene dispersion in the UP resin. The mean particle size is about 50 μm. The particles have a virtually round shape and a smooth surface.

c) Preparation and testing of SMC

The following resin/filler mixture was prepared with the aid of a high-speed stirrer:

```
100  parts of dispersion 1b)
0.3  part of propylene glycol
1.5  parts of tert-butyl perbenzoate
50   parts of Millicarb ® chalk filler
3.75 parts of MgO paste Luvatol ® MK 35
4.5  parts of Zn stearate
```

The SMC was prepared in a pilot plant, in which the resin/filler mixture on a polyethylene film was combined with chopped glass rovings (2.5 cm long), rolled up and stored for 3 days at 23° C. Thereafter, it was possible to peel off the cover sheets, and the nontacky SMC was pressed in a polished steel mold for 5 minutes under 50 bar at 145° C. to give 4 mm thick sheets having a glass fiber content of 28%. Table 1 shows the properties of the molding material of SMC 1c.

The falling ball test is carried out as follows. For this test, test specimens (80×80 mm) are prepared from 4 mm thick sheets of molding material and clamped between metal rings (diameter 60 mm), and a steel ball (761 g, diameter 57.1 mm) is allowed to fall thereon from a height of 70 cm. The tension side of the damaged test specimen is sprayed with red dye solution (diffusion red from H. Klumpf), washed with water after 5 min and dried, and the diameter of the red damage zone is determined. The test specimen is cut through the middle of the damage zone and the thickness of the red zone is measured at the cut surface (magnifying glass with scale). The lower the numerical values of both measurements, the more insensitive are the molding materials to impact.

TABLE 1

|  |  | Molding material of SMC 1c |
|---|---|---|
| Modulus of elasticity (according to EN 63) | [N/mm$^2$] | 8,900 |
| Impact strength (23° C.) (according to DIN 53,453) | [kJ/m$^2$] | 73 |
| Falling ball test |  |  |
| Damage depth | [mm] | 0.5 |
| Damage zone (Diameter) | [mm] | 15 |

EXAMPLES 2 AND 3

The melt dispersions of ethylene homopolymers B2 and B3 in the unsaturated polyester A1, the prepration of a dispersion in solution of polyester resin in styrene, which dispersion exhibits flow, and the processing of said dispersion to give an SMC on the laboratory scale are described.

a) Melt dispersion

For the preparation of unsaturated polyesters having a disperse polyethylene phase, ethylene homopolymers B2 and B3 were melted at 150° C. in a twin-screw extruder (type ZSK 30, Werner & Pfleiderer) and were each mixed with the melt of the unsaturated polyester A1 at 130° C. from a side extruder (100 revolutions/minute). The screw speed of the main extruder was 200 revolutions/minute, the melt temperature in the mixing zone was 140° C. and that at the extrusion die was 152° C. The melts were cooled on sheet metal supports, allowed to solidify to a glassy mass and then broken up, and pulverized at room temperature with the aid of a mill. These powders remained resistant to blocking during storage for several weeks. They each contained 60% of unsaturated polyester and 40% of ethylene homopolymers.

In a stirred apparatus, 30 parts of styrene were mixed, at 23° C., a little at a time with styrene, with each of the powders from 2a, stabilized with 500 ppm of 2,6-dimethylquinone and heated to 80° C. In the course of three hours dispersions had formed which exhibited flow and, on the basis of investigations by optical microscopy, had mean particle sizes of about 50 μm. Their viscosity (23° C.) was 19,000 [mPa.s] (with polyethylene B2) and 55,000 [mPa.s] (with polyethylene B3).

c) Preparation of SMC and testing of molding material

The following resin/filler mixture was prepared with the aid of a high-speed stirrer:

```
60   parts of dispersion 2a)
30   parts of UP resin A2
10   parts of polyethylene powder (milled, Lupolen 1 800 S,
     P 15 LP
100  parts of Millicarb ® chalk filler
4.5  parts of zinc stearate
1.5  parts of tert-butyl perbenzoate
3.75 parts of MgO paste Luvatol ® MK 35
```

The SMC was prepared on the laboratory scale. The above mixture was uniformly distributed on a polyethylene film and 30% of glass rovings (2.6 cm cut length) were sprinkled and, after being covered with a further film, were thoroughly impregnated by treatment in a roll mill. After 1 day, a nontacky semifinished product resulted and was pressed in a steel mold (4×160×160 mm) to give sheets (10 min, 145° C., 200 bar). The susceptibility of the molding materials to impact was evaluated by the falling ball test, similarly to Example 1. The advantageous behavior of the novel molding materials is evident from Table 2, in which the test results are summarized.

TABLE 2

| Example | Polyethylene-based dispersion | Falling ball test | |
|---|---|---|---|
| | | Damage zone [mm] | Penetration depth [mm] |
| 2 | B2 | 13 | 0.1 |
| 3 | B3 | 13 | 0.5 |

EXAMPLE 4

In a stirred vessel equipped with an $N_2$ feed line, an anchor stirrer and a metering apparatus, the melt of UP resin A1 (70 parts) was mixed, at 180° C. and a little at a time, with ethylene hompolymer B2 (29 parts) and polypropylene wax[1] (1 part) with vigorous stirring. After about 30 minutes at 180° C., the mixture was allowed to cool gradually to 140° C. with continued stirring, after which styrene which contained 1,000 ppm of 2,6-dimethylquinone for stabilization was run in. A finely divided dispersion having a viscosity (23° C.) of 3,150 [mPa.s] resulted. Optical microscopy gave a mean particle size of about 40 μm (dark field/transmitted light; magnification 100:1).

[1] Polypropylene wax obtained by thermal degradation and containing 6.5% of grafted maleic anhydride. Molecular weight about 25,000.

To test the dispersion, an SMC was prepared similarly to Example 2, on the laboratory scale, from the following resin/filler mixtures:

| | |
|---|---|
| 100 | parts of dispersion 3 |
| 100 | parts of Millicarb ® chalk filler |
| 4.5 | parts of zinc stearate |
| 1.5 | parts of tert-butyl perbenzoate |
| 3.75 | parts of MgO paste Luvatol ® MK 35 |
| 0.3 | part of propylene glycol |

The glass fiber content (cut rovings, 2.6 cm long) was 30%. After one day, a nontacky semifinished product resulted and was cured for 10 min at 200 bar and at 145° C. in a steel mold (4×160×160 mm). A test sheet cut therefrom was subjected to the falling ball test as described in Example 1. The results indicate low sensitivity of the novel molding material to impact.

| Falling ball test | |
|---|---|
| Damage zone [mm] | Penetration depth [mm] |
| 12 | 0.7 |

We claim:

1. A process for the preparation of a curable molding material, comprising:
   (a) uniformly distributing, in the absence of a free radical initiator, a melt of an ethylene polymer in a melt of an unsaturated polyester, to form a mixture; and
   (b) mixing said mixture with a vinyl monomer to dissolve said unsaturated polyester and form a dispersion,
   wherein said mixture comprises, based on the sum of the weights of said ethylene polymer and said unsaturated polyester,
   i) from 10% to 50% by weight of said ethylene polymer, and
   ii) from 90% to 50% by weight of said unsaturated polyester, and
   wherein said dispersion comprises, based on 100 parts by weight of said ethylene polymer and said unsaturated polyester,
   iii) from 10 to 100 parts by weight of said vinyl monomer, and
   iv) from 0 to 15 parts by weight of a dispersant.

2. A process as claimed in claim 1, wherein a dispersant is added.

3. A process as claimed in claim 1, wherein the finely divided ethylene polymer is dispersed in the form of round particles having a mean diameter of from 2 to 200 μm in the polyester resin.

4. The process of claim 1, wherein in said distributing (a) of said melt of an ethylene polymer in said melt of an unsaturated polyester is carried out in an extruder.

5. The process of claim 4, wherein said distributing lasts from 20 to 300 seconds.

6. The process of claim 4, wherein said distributing is carried out in a shear field with a dissipation energy of from 0.05 to 0.4 kWh/kg.

7. The process of claim 4, wherein said distributing lasts from 20 to 300 seconds in a shear field with a dissipation energy of from 0.05 to 0.4 kWh/kg.

8. The process of claim 1, wherein in said distributing (a) of said melt of an ethylene polymer in said melt of an unsaturated polyester is carried out in a stirred kettle.

* * * * *